(12) United States Patent  
Tanaka et al.

(10) Patent No.: US 6,679,808 B2
(45) Date of Patent: Jan. 20, 2004

(54) STARTING SHIFT CONTROL SYSTEM AND METHOD FOR CONTINUOUSLY VARIABLE TRANSMISSION

(75) Inventors: Hiroyasu Tanaka, Kanagawa (JP); Shigeki Shimanaka, Kanagawa (JP); Junya Takayama, Saitama (JP); Satoshi Takizawa, Yokohama (JP); Masato Koga, Kanagawa (JP); Takayuki Suzuki, Kanagawa (JP); Takashi Hara, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/953,893

(22) Filed: Sep. 18, 2001

(65) Prior Publication Data

US 2002/0037791 A1 Mar. 28, 2002

(30) Foreign Application Priority Data

Sep. 27, 2000 (JP) ......................... 2000-294493

(51) Int. Cl.$^7$ .......................... B60K 41/04; B60K 41/12
(52) U.S. Cl. .......................... 477/115; 477/37
(58) Field of Search ............... 477/37, 97, 98, 477/115, 125, 110, 111; 701/51, 55

(56) References Cited

U.S. PATENT DOCUMENTS

| | | | |
|---|---|---|---|
| 4,793,217 A | | 12/1988 | Morisawa et al. |
| 4,823,267 A | | 4/1989 | Kumura |
| 4,854,194 A | * | 8/1989 | Kaneko et al. ............... 74/866 |
| 5,005,442 A | | 4/1991 | Sakakibara et al. |
| 5,655,991 A | * | 8/1997 | Lardy et al. ............. 477/37 X |
| 6,045,481 A | * | 4/2000 | Kumagai ................. 477/37 |
| 6,080,080 A | * | 6/2000 | Bolz et al. .................. 477/39 |
| 6,185,494 B1 | * | 2/2001 | Wadas ................ 477/115 X |
| 6,312,357 B1 | * | 11/2001 | Sakai et al. ............... 477/37 |
| 6,394,931 B1 | * | 5/2002 | Genise ..................... 477/97 |
| 6,412,361 B1 | * | 7/2002 | Wolf et al. ........... 477/115 X |
| 6,478,712 B1 | * | 11/2002 | Kawamura ................ 477/37 |
| 2002/0033312 A1 | | 3/2002 | Saito |
| 2002/0033314 A1 | | 3/2002 | Kato |
| 2002/0034997 A1 | | 3/2002 | Saito |
| 2002/0034999 A1 | | 3/2002 | Saito |
| 2002/0035000 A1 | | 3/2002 | Saito |
| 2002/0035009 A1 | | 3/2002 | Saito |
| 2002/0035011 A1 | | 3/2002 | Saito |
| 2002/0035012 A1 | | 3/2002 | Murasugi et al. |
| 2002/0035013 A1 | | 3/2002 | Saito |
| 2002/0035014 A1 | | 3/2002 | Saito |
| 2002/0037784 A1 | | 3/2002 | Saito |

OTHER PUBLICATIONS

European Search Report dated Jan. 10, 2002.
U.S. patent application Ser. No. 09/936811, Murasugi et al., filed Sep. 18, 2001.

* cited by examiner

Primary Examiner—Roger Pang
(74) Attorney, Agent, or Firm—Foley & Lardner

(57) ABSTRACT

A starting shift control system for a continuously variable transmission is provided which includes a control unit having a high start judgment device for judging whether or not a high start in a high speed side gear ratio is caused on the basis of a comparison between the generated number of the input rotation pulses and the generated number of the output rotation pulses from the time a first vehicle starting operation is performed after start of a prime mover, and a high start control device for restricting downshifting from the high speed side gear ratio to a target gear ratio when a start of the vehicle is judged to be the high start. A starting shift control method is also provided.

32 Claims, 5 Drawing Sheets

STARTING SHIFT CONTROL SYSTEM AND METHOD FOR CONTINUOUSLY VARIABLE TRANSMISSION

BACKGROUND OF THE INVENTION

The present invention relates to a shift control system for a continuously variable transmission (CVT) and particularly to a starting shift (i.e., gear shift at start of a vehicle) control system for a CVT when the vehicle is started by starting an engine, with the CVT being in a high speed side gear ratio due to traction of the vehicle under an engine stopped condition where an oil pressure for shift control is not produced. The present invention further relates to a starting shift control method for a continuously variable transmission.

A toroidal or V-belt CVT is capable of producing a continuously variable output which is obtained by varying the rotational speed of an input from an engine continuously and is therefore excellent in transmission quality as compared with a transmission having limited gear ratios.

Normal shift of the CVT is made as follows. Pulse gears are provided which are rotatable with an input shaft and output shaft of the CVT, respectively. Magnetic pickups or hole IC sensors are disposed opposite to the respective pulse gears for fetching input rotation pulses generated at repetition periods corresponding to input rotation and output rotation pulses generated at repetition periods corresponding to output rotation. On the basis of the input and output rotation pulses, an actual gear ratio is obtained. The CVT is shifted so that the actual gear ratio becomes equal to a target gear ratio.

Figure 5:
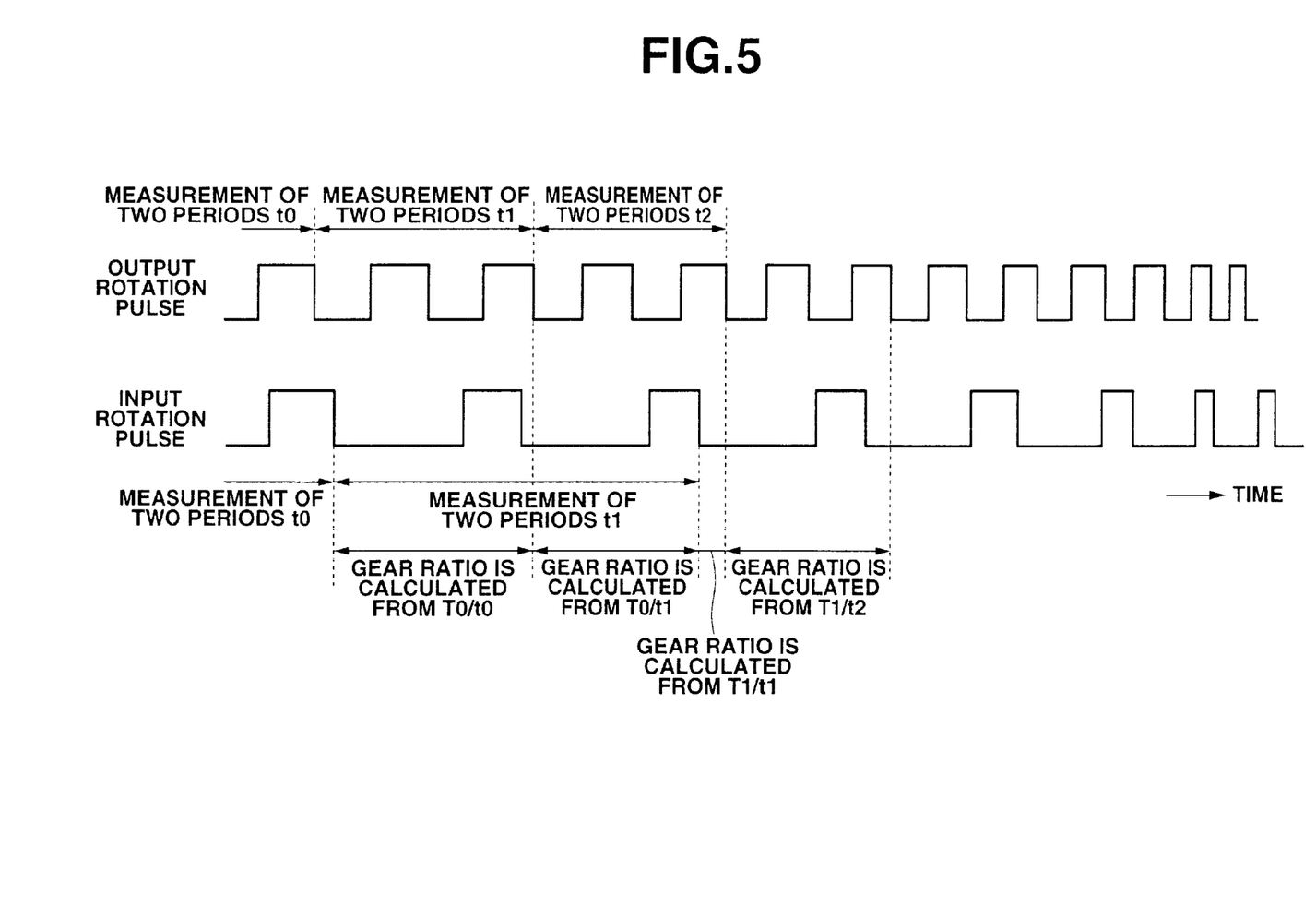
FIG. 5 is a time chart of input and output rotation pulses of the CVT for illustrating an actual gear ratio calculating operation executed in a control unit for the CVT.

How to obtain the actual gear ratio will be described with respect to the case where the periods of input rotation pulses and the periods of output rotation pulses are caused to become shorter gradually with increase of the input rotation speed and the output rotation speed. Measurement of times t0, t1, t2—for two periods of output rotation pulses and T1, T2, T3—for two periods of input rotation pulses is made continuously. At the end of each measurement of two periods of the input and output rotation pulses, the time for two periods of output rotation pulses which was obtained by the previous measurement is divided by the time for two periods of the input rotation pulses which was obtained by the previous measurement, to obtain the actual gear ratios (T0/t0), (T0/t1), (T1/t1), (T1/T2) as shown in FIG. 5.

When the CVT is in the normally used speed range, the repetition periods of the input and output rotation pulses are relatively short, so that the actual gear ratio can be obtained with a high accuracy on the basis of the repetition periods of the input and output rotation pulses.

However, since the input and output shafts differ in normally used speed range from each other, the input and output pulse gears are constructed so as to have a different number of the gear teeth. By this, the timing at which the input rotation pulse repetition period is measured and the timing at which the output rotation pulse repetition period is measured (i.e., timings at which data are updated) are different from each other. Further, since a filter processing is conducted for removal of noise, accurate processing of the actual gear ratio cannot be attained when updating of data is conducted once or so. For the above reason, in the quite low speed range immediately after start of the vehicle, the input and output rotation repetition periods exceed beyond the limits, so that as a matter of fact, the actual gear ratios cannot be calculated.

In this instance, it is a usual practice to set the actual gear ratio at an allowable fixed value (normally, lowermost speed gear ratio) for the convenience of a shift control.

On the other hand, when the CVT, particularly toroidal CVT receives an input of rotational force reversely from the wheel side due to traction of the vehicle under an engine stopped condition where an oil pressure for a shift control is not produced, it tends to shift to a high speed side gear ratio arbitrarily. When the engine is started with the CVT in a high speed side gear ratio, the following problem is caused.

Although it is natural that the CVT determines the target gear ratio to a lowermost speed gear ratio at start of the vehicle, a shift from the above described high speed side gear ratio before start of the vehicle to the lowermost speed gear ratio can not be attained unless rotation of the CVT is caused by the start of the vehicle, thus causing the vehicle to start with the CVT in the above described high speed side gear ratio (this start will be referred to hereinafter as high start).

At the time of this high start, the driver feels a lack of torque due to the high speed side gear ratio and depresses further the accelerator pedal having been depressed at start of the vehicle. By this, the vehicle is started to cause rotation of the CVT. Immediately after rotation of the GVT is caused, a shift from the high speed side gear ratio before start to the lowermost speed gear ratio is caused. Such a shift at start of the vehicle is undesired since it inevitably deteriorates the riding comfort of the vehicle.

This problem is pronounced particularly in the toroidal CVT since the shift response of the toroidal CVT is particularly faster as compared with the other type of CVT.

In the meantime, when the CVT is caused to operate at such a rotation speed that enables calculation of the actual gear ratio to be executed accurately in the above described manner, it becomes possible to execute a normal shift control for causing the actual gear ratio to follow the target gear ratio (i.e., the lowermost speed gear ratio due to start) which is determined in accordance with the vehicle driving condition. However, this is the time after the above described problem has been already caused and settled.

SUMMARY OF THE INVENTION

To solve the above described problem, it is considered such a countermeasure against the high start wherein the target gear ratio is once regulated not to the lowermost speed gear ratio but to the intermediate gear ratio, so that the transmission is once shifted from the high speed side gear ratio before start down to the intermediate gear ratio and thereafter to the lowermost speed gear ratio which is a normal target gear ratio at start of the vehicle.

However, when the actual gear ratio is calculated from the input and output pulse repetition periods as in the prior art, it is impossible, as described above, to calculate the actual gear ratio when the CVT is in a quite low speed range after start of the vehicle, thus making it impossible to detect even the high start and therefore making it possible to employ the above described countermeasure.

It is accordingly an object of the present invention to provide a starting shift control system for a continuously variable transmission which is free from the above described problem inherent in the prior art device.

It is a further object of the present invention to provide a starting shift control method for a continuously variable transmission which can solve the above noted problems.

To accomplish the above objects, there is provided according to an aspect of the present invention a starting shift control system for a continuously variable transmission for a vehicle, comprising an input rotation detector for detecting an input rotation of the transmission drivingly connected to a prime mover of the vehicle and producing input rotation pulses at periods corresponding to the input rotation, an output rotation detector for detecting an output rotation of the transmission and producing output rotation pulses at periods corresponding to the output rotation, and a control unit for calculating an actual gear ratio on the basis of the input rotation pulses and the output rotation pulses and controlling so that the actual gear ratio becomes equal to a target gear ratio, wherein the control unit includes a high start judgment device for judging whether or not a start of the vehicle is a high start in a high speed side gear ratio by comparison between the number of the input rotation pulses and the number of the output rotation pulses from the time a first vehicle starting operation is made after start of the prime mover, and a high start control device for restricting downshifting from the high speed side gear ratio to the target gear ratio when the start of the vehicle is judged to be the high start.

According to another aspect of the present invention, there is provided a starting shift control method for a continuously variable transmission for a vehicle, comprising detecting an input rotation of the transmission drivingly connected to a prime mover of the vehicle and producing input rotation pulses at periods corresponding to the input rotation, detecting an output rotation of the transmission and producing output rotation pulses at periods corresponding to the output rotation, and calculating an actual gear ratio on the basis of the input rotation pulse and the output rotation pulse, and controlling so that the actual gear ratio becomes equal to a target gear ratio, wherein the controlling includes judging whether or not a start of the vehicle is a high start in a high speed side gear ratio by comparison between the number of the input rotation pulses and the number of the output rotation pulses from the time a first vehicle starting operation is made after start of the prime mover, and restricting downshifting from the high speed side gear ratio to the target gear ratio when the start of the vehicle is judged to be the high start.

DESCRIPTION OF THE PREFERRED EMBODIMENTS

Figure 1:
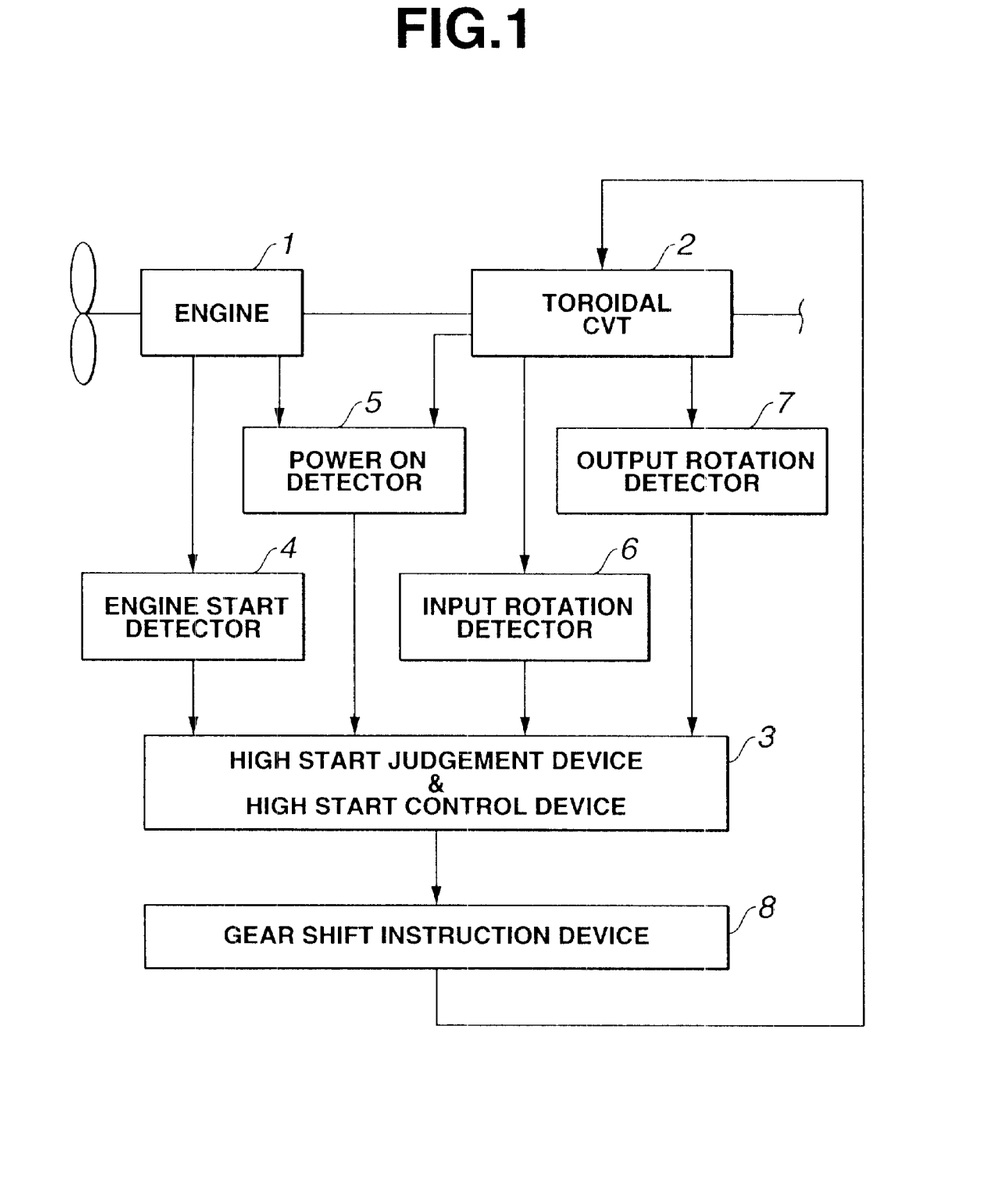
FIG. 1 is a diagrammatic view of a starting shift control system for a CVT according to an embodiment of the present invention, together with a power train of a vehicle.

Referring first to FIG. 1, a power train of a vehicle includes an internal combustion engine 1 which serves as a prime mover, and a toroidal continuously variable transmission (CVT) 2.

The engine 1 is started by an ignition switch (not shown) and its output is controlled by a throttle valve (not shown) which increases in opening degree as it moves from a fully closed position toward a fully open position in accordance with depression on an accelerator pedal (not shown) by a vehicle driver.

The toroidal CVT 2 is operated in accordance with a selected range which is selected manually by a driver by using a manual selection lever, e.g., one of a parking (P) range, a reverse (R) range, a neutral (N) range, an automatic forward drive (D) range and an engine brake (Ds) range. In the parking (P) range and neutral (N) range, the CVT 2 does not produce an output in response to an input from the engine 1 so as to enable the vehicle to park or stop. In the reverse (R) range, the CVT 2 produces an output in response to an input from the engine 1 after reversing the rotational direction for thereby enabling the vehicle to move backward. In the forward drive (D) range and engine brake (Ds) range, the CVT 2 produces an output in response to an input from the engine 1 after changing the torque and rotational speed of the input continuously.

In this embodiment, the starting shift control system is comprised of an integrated control unit 3 including a high start judgment device and a high start control device. To the control unit 3 are inputted a signal from an engine start detector 4 for detecting a start of the engine 1, a signal from a power on detector 5 for detecting a power-on condition in which the power of the engine 1 is increased through depression of the accelerator pedal (not shown) when the toroidal CVT 2 is in a range other than the parking (P) range and the neutral (N) range and the engine 1 is idling, a signal from an input rotation detector 6 for detecting an input rotation of the toroidal CVT 2, and a signal from an output rotation detector 7 for detecting an output rotation of the toroidal CVT 2.

In this connection, the input rotation detector 6 and the output rotation detector 7 are comprised of pulse gears (not shown) which are rotatable with the input shaft and output shaft (not shown) of the toroidal CVT 2 and magnetic pickups or hole IC sensors disposed so as to face the teeth of the pulse gears, respectively. By the magnetic pickups and hole IC sensors, input rotation pulses produced at periods corresponding to transmission input rotation and output rotation pulses produced at periods corresponding to transmission output rotation are supplied to the control unit 3.

At the time of a shift of the toroidal CVT 2, including the shift at start of the vehicle, the actual gear ratio is usually obtained on the basis of the above described input and output pulse repetition periods in the manner having been described with reference to FIG. 5, and the shift of the GVT 2 is made so as to coincide the actual gear ratio with the target gear ratio which is determined according to the driving condition of the vehicle. However, particularly at the time of high start in which the CVT 2 is in a condition of providing a high speed side gear ratio, the high start judgment device of the control unit 3 judges the start to be the high start. Then, the target gear ratio for the countermeasure to high start is determined by the high start control device of the control unit 3. By the gear shift instruction device 8, the toroidal CVT 2 is controlled so as to be shifted to the target gear ratio.

Figure 2:
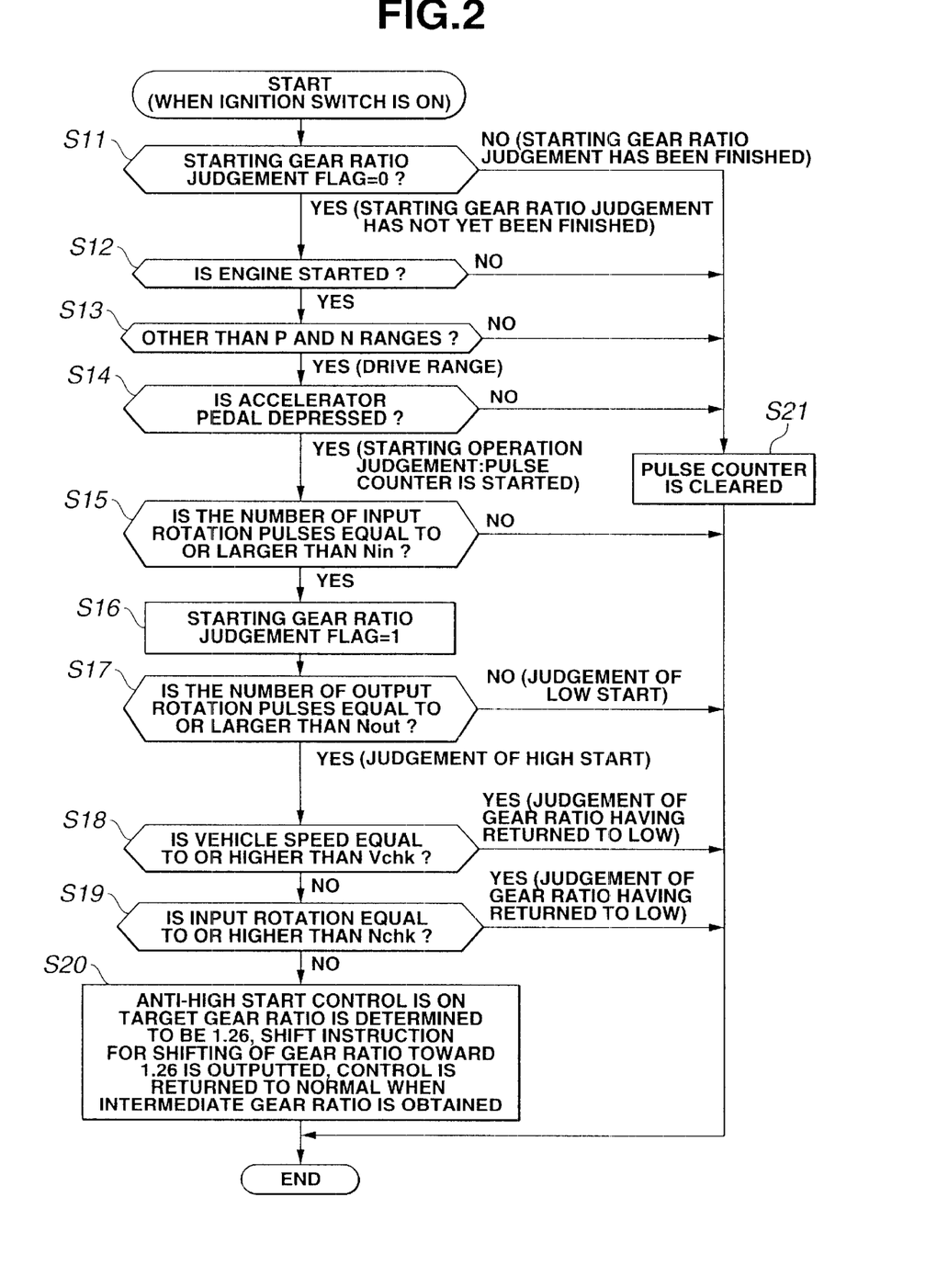
FIG. 2 is a flowchart of a starting shift control which is executed by the starting shift control system of FIG. 1.

The high start judgment device and the high start control device within the control unit 3 performs a shift control at high start on the basis of the above described information inputted to the control unit 3 and by executing the control program shown in FIG. 2.

The control program shown in FIG. 2 is started when the ignition switch (not shown) of the engine 1 is turned on to enable start of the engine 1. Firstly, in step S11, it is judged whether or not a starting gear ratio (i.e., gear ratio at start) judgment flag, which will be described hereinlater, is zero and on the basis of this judgment it is determined whether the judgment on the gear ratio which is made only when a first vehicle start operation is performed after start of the engine 1 (starting gear ratio judgment) has already been finished.

When the starting gear ratio judgment has not yet been finished, the program proceeds to step S12 where it is judged whether or not the engine 1 is started. When the judgment in step S12 is affirmative, the program proceeds to step S13 where it is judged whether or not a selected range of the CVT 2 is other than the parking (P) and neutral (N) ranges. When the judgment in step S13 is affirmative, the program proceeds to step S14 where it is judged whether or not the accelerator pedal has been depressed (i.e., accelerator ON). When the judgment in step S14 is affirmative, i.e., it is judged that a first vehicle starting operation after start of the engine 1 has been made, a pulse counter for counting the generated number of the input and output rotation pulses is started for executing the following control.

In step S15, it is judged whether or not the number of the input rotation pulses having been generated since the first vehicle starting operation after start of the engine 1 reaches a predetermined number Nin. When the judgment in step S15 is affirmative, the program proceeds to step S16 where the above described starting gear ratio judgment flag is set at 1 (one). Then, in step S17, it is judged whether or not the number of the output rotation pulses having been generated since the first vehicle starting operation after start of the engine 1 reaches a predetermined number Nout.

Figure 3:
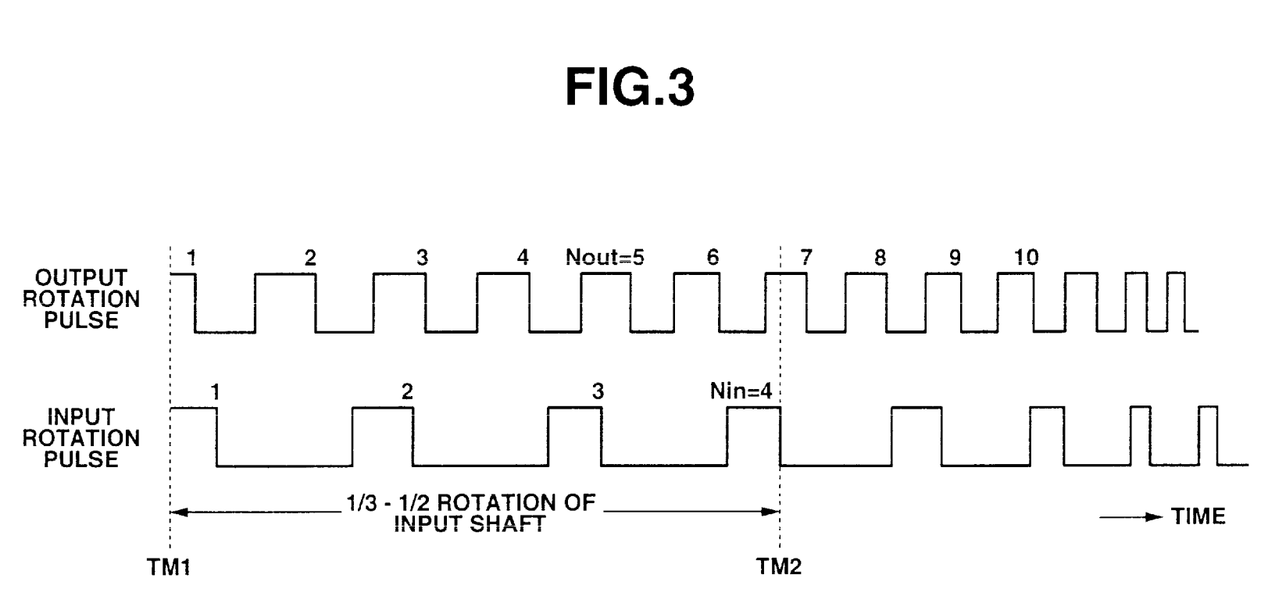
FIG. 3 is a time chart of input and output rotation pulses of the CVT for illustrating a high start judging operation executed by the starting shift control system of FIG. 1.

At start of the vehicle, the input and output rotation pulses are generated as shown in FIG. 3. Namely, the pulse counter is started at the moment TM1 to start counting the number of the both input and output rotation pulses having been generated since the first vehicle starting operation after start of the engine 1, and it is judged at the moment TM2 when the generated number of the input rotation pulses has reached a predetermined number Nin (=4) whether or not the generated number of the output rotation pulses is equal to or larger than a set value Nout (=5).

In the meantime, the starting gear ratio judgment flag is held to be 1 (one) until the ignition switch is turned off.

As shown in FIG. 3, in case the generated number of the output rotation pulses is larger than the set value Nout when the number of the input rotation pulses having been generated since the first vehicle starting operation after start of the engine 1 has reached a predetermined number Nin, it is meant by this that the amount of output rotation is larger as compared with the amount of basic input rotation and therefore the CVT 2 is in a high speed side gear ratio. When this is the case, it is judged that a first start of the vehicle after start of the engine 1 is a high start in a high start side gear ratio.

On the contrary, in case the generated number of the output rotation pulses is smaller than the set value Nout when the number input rotation pulses having been generated since the first vehicle starting operation after start of the engine 1 reaches a predetermined number Nin, it is meant by this that the amount of output rotation is smaller as compared with the amount of basic input rotation and therefore the CVT 2 is in a low speed side gear ratio. When this is the case, it is judged that the first start of the vehicle after start of the engine 1 is a low start in a low speed side gear ratio.

In this instance, the above described predetermined value Nin related to the generated number of the input rotation pulses is set at a value corresponding to the amount of transmission input rotation before the actual gear ratio having been a high speed side gear ratio before start of the vehicle is regulated to a lowermost speed gear ratio which is a target gear ratio at start of the vehicle (e.g., $\frac{1}{3}$ to $\frac{1}{2}$ of input rotation in case of a toroidal CVT as shown in FIG. 3).

Further, the set value Nout related to the generated number of the output rotation pulses is set at a value corresponding to a high speed side gear ratio indicative of a high start which is causative of the above described problem, in relation to the predetermined number Nin concerned with the generated number of the input rotation pulses.

When it is judged in step S17 that the generated number of the output rotation pulses is equal to or larger than Nout, i.e., it is judged in step S17 that the high start is detected, the program proceeds to step S18 where it is judged whether or not the vehicle speed is in a relatively high speed range, i.e., equal to or larger than Vchk which makes it possible to obtain the output rotation from the repetition periods of output rotation pulses as having been described with reference to FIG. 5. When the judgment in step S18 is negative, the program proceeds to step S19 where it is judged whether or not the input rotation is in a relatively high input rotation range, i.e., equal to or larger than Nchk which makes it possible to obtain an input rotation from the repetition periods of output rotation pulses as having been described with reference to FIG. 5. When the judgment in step S19 is negative, i.e., when the actual gear ratio has not yet been returned to a gear ratio which solves the high start, the program proceeds to step S20 where the following anti-high start control is executed.

By this anti-high start control, an intermediate gear ratio (e.g., 1.26) which is intermediate between a high speed side gear ratio corresponding to the set value Nout of the generated number of the output rotation pulses at the time of the above described high start and the lowermost speed gear ratio which is a target gear ratio at start of the vehicle is used as an initial target gear ratio. When the actual gear ratio coincides with the intermediate gear ratio or the difference between the actual gear ratio and the intermediate gear ratio is reduced so as to be within a set value and allow the both to come closer, the control is returned to a normal shift control.

In this embodiment, from the time the first vehicle starting operation is made after start of the engine, the generated number of the input rotation pulses and the generated number of the output rotation pulses are compared with each other to obtain the actual gear ratio at start of the vehicle and thereby determine whether a start of the vehicle is a high start or not. By this, even in case the pulse repetition periods are extremely long, e.g., at the time immediately after start of the vehicle, it becomes possible to obtain the actual gear ratio assuredly to make the judgment on the high start. Further, it becomes possible to calculate the actual gear ratio even when the amount of rotation is small such as a half turn and detect the high start before the actual gear ratio is shifted from the high speed side gear ratio before start of the vehicle to the lowermost speed gear ratio which is the target gear ratio at start of the vehicle, thus enabling the above described anti-high start control to be employed to produce an anti-high start effect sufficiently.

Furthermore, in this embodiment, a start of the vehicle is judged to be a high start when the generated number of the output rotation pulses at the time of generation of a predetermined number Nin of input rotation pulses is equal to or larger than a set value Nout, thus making it possible to attain a high start detection by a simple method based on the generated number of the input rotation pulses.

Figure 4:
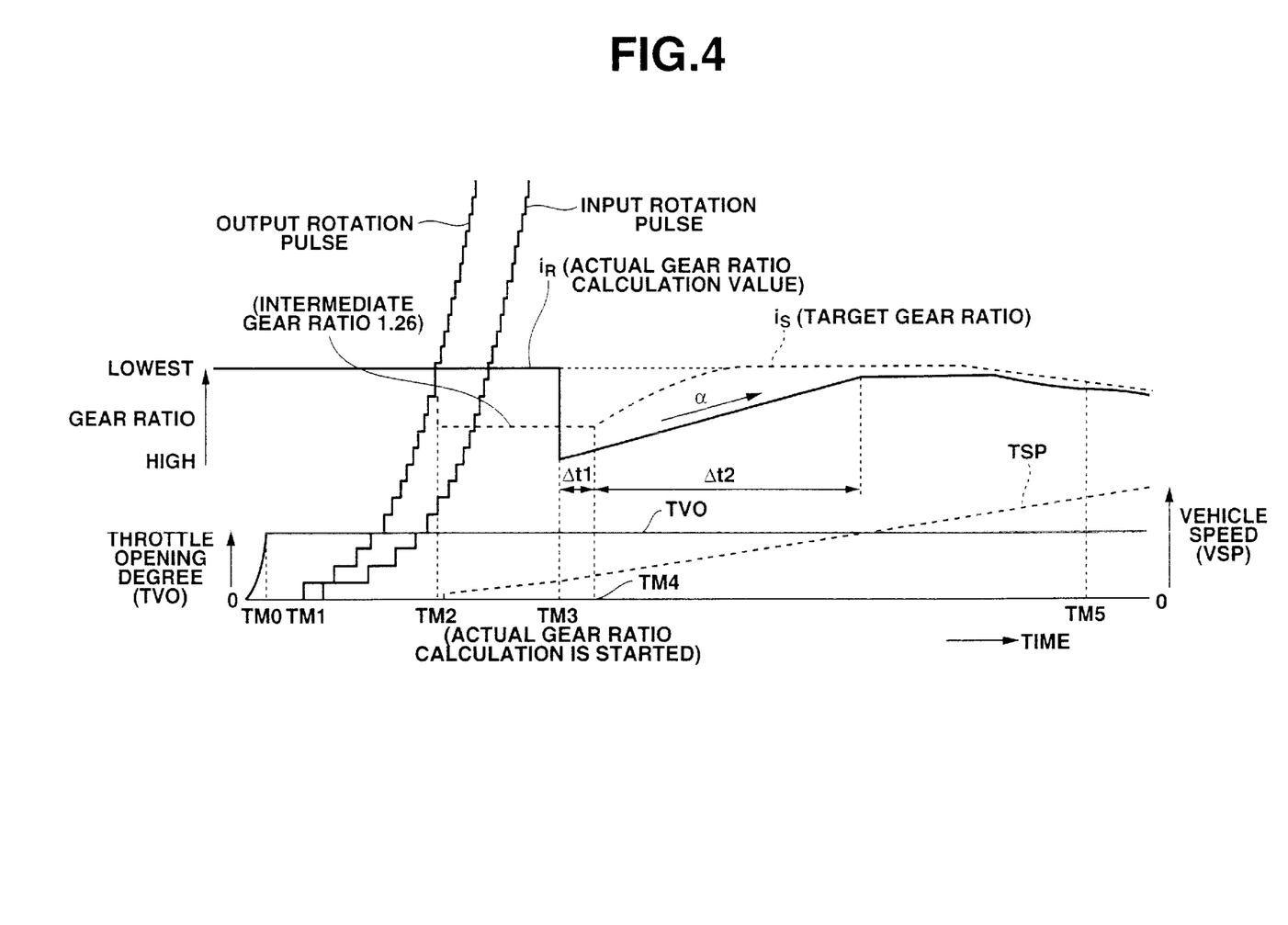
FIG. 4 is a time chart for illustrating an anti-high start control which is executed by a starting shift control system according to another embodiment of the present invention.

FIG. 4 shows an anti-high start control according to another embodiment of the present invention.

As shown in FIG. 4, when the accelerator pedal is depressed to increase the throttle opening degree TVO at the moment TM0 and thereby perform a first vehicle starting operation after start of the engine, the input and output rotation pulses are generated. It is started to calculate the numbers of these pulses at the moment TM1. An anti-high start control is shown with respect to the case where the number of the output rotation pulses is equal to or larger than the set value Nout at the moment TM2 when a predetermined number Nin of input rotation pulses are generated and therefore the start of the vehicle is judged to be the high start at the moment TM2.

However, at the moment TM2 of detection of the high start, rotation of the CVT 2 is quite low since it is the time immediately after start of the vehicle. Thus, it is impossible to obtain an actual gear ratio calculation value $i_R$ from the pulse repetition periods as described with respect to FIG. 5. The actual gear ratio calculation value $i_R$ is regulated to a fixed value which is the lowermost speed gear ratio, until the moment TM3 enabling calculation of the actual gear ratio calculation value iR. After the moment TM3, calculation is executed as shown in FIG. 4.

For the anti-high start control, the target gear ratio $I_s$ is regulated to an intermediate gear ratio (e.g., 1.26) which is intermediate between the high speed side gear ratio for the high start judgment and the lowermost speed gear ratio. This condition is maintained from the moment TM3 when calculation of the actual gear ratio is started to the moment TM4 when it elapses from the moment TM3 a predetermined time Δt1 which is necessary for calculation of the actual gear ratio IR to become stable.

After the moment TM4, the target gear ratio $i_S$ is caused to vary gradually from the intermediate gear ratio toward a suitable gear ratio (initially, the lowermost speed gear ratio since it is the time of start of the vehicle) corresponding to the vehicle driving condition so that the actual gear ratio $i_R$ is varied gradually as indicated by the arrow α without causing any shock.

As described above, the anti-high start control is executed so that the actual gear ratio $i_R$ follows the target gear ratio $i_s$. Also in this instance, the intermediate gear ratio (for example, 1.26) is used as an initial target gear ratio, so that at start of the vehicle there does not occur such a case wherein the gear shift is caused to proceed all at once from the high speed side gear ratio before start of the vehicle to the lowermost speed gear ratio which is the target gear ratio at start of the vehicle. Thus, it becomes possible to prevent rapid increase of the vehicle wheel driving torque at the high start and therefore a confusion of the vehicle driver.

In the meantime, in this embodiment, the anti-high start control is completed at the moment TM5 shown in FIG. 4 when the actual gear ratio $i_R$ coincides with a suitable gear ratio (initially, the lowermost speed gear ratio since it is the time of start of the vehicle) corresponding to the driving condition or becomes closer to the suitable gear ratio so that the difference therebetween is within a set value.

Due to this, returning from the anti-high start control to the normal shift control can be performed without causing any shock.

In the meantime, though the problem of the shock remains a little, the anti-high start control can be simplified by returning the anti-high start control to the normal shift control at any time after lapse of a set time t2 from the moment TM4 shown in FIG. 4.

In case it is judged in step S11 in FIG. 2 that the starting gear ratio judgment is finished, in step S12 that the engine 1 has not yet been started, in step S13 that the P or N range is selected, or in step S14 that the accelerator pedal is not depressed, i.e., in case it is impossible to judge that the first vehicle start operation after start of the engine is performed, the program proceeds to step S21 where the above described pulse counter is cleared and reset to zero to make ready for the next control.

Further, when it is judged in step S15 that the generated number of the input rotation pulses from the time the first vehicle starting operation is made after start of the engine is less than a predetermined value Nin, and it is judged in step S17 that the generated number of the output rotation pulses from the time the first vehicle starting operation is made after start of the vehicle is less than a predetermined value Nout, i.e., at the time of judgment of a low start, the control is finished since the anti-high start control in step S20 is unnecessary.

Further, when it is judged in step S18 that the vehicle speed Vchk is in a relatively high speed range, or it is judged in step S19 that the input rotation is in a relatively high rotation range equal to or higher than Ncnk, the control is finished without executing the anti-high start control. By this, the following effect can be attained.

For example, at start of the vehicle wherein the first vehicle starting operation is made while allowing the vehicle to creep along a downhill after start of the engine, the CVT 2 provides a high speed side gear ratio according to the operating condition of the vehicle. If such a condition is judged to be the high start and a target gear ratio is determined to be an intermediate gear ratio, there occurs a useless shift from the high speed side gear ratio suited to the vehicle driving condition to the intermediate gear ratio.

However, in FIG. 2, when the vehicle speed is in a relatively high speed range equal to or larger than Vchk or when the input rotation is in a relatively high rotation range equal to or higher than Ncnk, the step S20 is skipped, thus making it possible to prevent an ill influence caused by a useless anti-high start control resulting from an erroneous judgment of judging the above condition to be the high start.

While in the above described embodiment, judgment of the high start is made when the number of the output rotation pulses at the moment when a predetermined number Nin of input rotation pulses are generated from the time the first vehicle starting operation after start of the engine is made, is equal to or larger than a set value Nout. In place of this, the judgment of the high start can be made when the generated number of the input rotation pulses at the moment when a predetermined number of the output rotation pulses are generated is less than a set value (first alternative judgment) or the judgment of the high start can be made depending upon a ratio or difference between the generated number of the input rotation pulses and the generated number of the output rotation pulses during a set time elapsing from the time the first vehicle starting operation is made after start of the engine (second alternative judgment). By the above two alternative judgments, the same effect can be attained.

In this instance, it is needless to say that in case of the above described first alternative judgment, the predetermined number relating to the output rotation pulses is made to correspond to the amount of output rotation before the actual gear ratio becomes the target gear ratio, and in case of the second alternative judgment the set time is an expected time before the actual gear ratio becomes equal to the target gear ratio.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A starting shift control system for a continuously variable transmission for a vehicle, comprising:
    an input rotation detector for detecting an input rotation of the transmission and producing input rotation pulses at repetition periods corresponding to the input rotation;
    an output rotation detector for detecting an output rotation of the transmission drivingly connected to a prime mover of the vehicle and producing output rotation pulses at repetition periods corresponding to the output rotation; and
    a control unit for calculating an actual gear ratio of the transmission on the basis of the input rotation pulses and the output rotation pulses and controlling so that the actual gear ratio becomes equal to a target gear ratio;
    wherein the control unit includes a high start judgment device for judging whether or not a start of the vehicle is a high start in which the actual gear ratio at the start of the vehicle is a high speed side gear ratio by comparison between the number of the input rotation pulses and the number of the output rotation pulses from the time a first vehicle starting operation is made after start of the prime mover, and a high start control device for restricting downshifting from the high speed side gear ratio to the target gear ratio when the start of the vehicle is judged to be the high start.

2. A starting shift control system according to claim 1, wherein the high start judgment device judges the start of the vehicle to be the high start when the generated number of the output rotation pulses at the moment when a predetermined number of the input rotation pulses are generated, is equal to or larger than a set value.

3. A starting shift control system according to claim 2, wherein the predetermined number of the input rotation pulses is matched with the amount of input rotation of the transmission before the actual gear ratio becomes equal to the target gear ratio.

4. A starting shift control system according to claim 1, wherein the high start judgment device judges the start of the vehicle to be the high start when the generated number of the input rotation pulses at the moment when a predetermined number of the output rotation pulses are generated, is less than a set value.

5. A starting shift control system according to claim 4, wherein the predetermined number of the output rotation pulses is matched with the amount of output rotation before the actual gear ratio becomes equal to the target gear ratio.

6. A starting shift control system according to claim 1, wherein the high start judgment device judges whether or not the start of the vehicle is the high start on the basis of the ratio between the generated number of the input rotation pulses and the generated number of the output rotation pulses during a set time elapsing from the time the first vehicle starting operation is made after start of the prime mover.

7. A starting shift control system according to claim 6, wherein the set time is an expected time before the actual gear ratio becomes equal to the target gear ratio.

8. A starting shift control system according to claim 1, wherein the high start judgment device judges whether or not the start of the vehicle is the high start on the basis of the difference between the generated number of the input rotation pulses and the generated number of the output rotation pulses during a set time elapsing from the time the first vehicle starting operation is made after start of the prime mover.

9. A starting shift control system according to claim 8, wherein the set time is an expected time before the actual gear ratio becomes equal to the target gear ratio.

10. A starting shift control system according to claim 1, wherein the high start judgment device stops a judgment on the high start when a vehicle speed is in a relatively high speed range enabling the output rotation to be obtained from the repetition periods of the output rotation pulses.

11. A starting shift control system according to claim 1, wherein the high start judgment device stops a judgment on the high start when the input rotation is in a relatively high rotation range enabling the input rotation to be obtained from the repetition periods of the input rotation pulses.

12. A starting shift control system according to claim 1, wherein the high start control device permits a downshift to be an intermediate gear ratio between the high speed side gear ratio at the time of judgment of the high start and a lowermost speed gear ratio and returns a shift control to normal when the actual gear ratio coincides with the intermediate gear ratio.

13. A starting shift control system according to claim 1, wherein the high start control device permits a downshift to be an intermediate gear ratio between the high speed side gear ratio at the time of judgment of the high start and a lowermost speed gear ratio and returns a shift control to normal when a difference between the actual gear ratio and the intermediate gear ratio is equal to or smaller than a predetermined value.

14. A starting shift control system according to claim 1, wherein the high start control device permits a downshift to be an intermediate gear ratio between the high speed side gear ratio and a lowermost speed gear ratio at the time of judgment of the high start, changes the target gear ratio gradually from the intermediate gear ratio toward an optimal gear ratio suited to a driving condition of the vehicle after the transmission is in such a rotation range enabling calculation of the actual gear ratio by obtaining the input rotation and the output rotation from the respective repetition periods of the input rotation pulses and the output rotation pulses, and returns a shift control to normal when the actual gear ratio coincides with the optimal gear ratio.

15. A starting shift control system according to claim 1, wherein the high start control device permits a downshift to be an intermediate gear ratio between the high speed side gear ratio and a lowermost speed gear ratio at the time of judgment of the high start, changes the target gear ratio gradually from the intermediate gear ratio toward an optimal gear ratio suited to a driving condition of the vehicle after the transmission is in such a rotation range enabling calculation of the actual gear ratio by obtaining the input rotation and the output rotation from the respective repetition periods of the input rotation pulses and the output rotation pulses, and returns a shift control to normal when the difference between the actual gear ratio and the optimal gear ratio is equal to or smaller than a set value.

16. A starting shift control system according to claim 1, wherein the high start control device permits a downshift to be an intermediate gear ratio between the high speed side gear ratio and a lowermost speed gear ratio at the time of judgment of the high start, changes the target gear ratio gradually from the intermediate gear ratio toward an optimal gear ratio suited to a driving condition of the vehicle during a set time after the transmission is in such a rotation range enabling calculation of the actual gear ratio by obtaining the input rotation and the output rotation from the respective repetition periods of the input rotation pulses and the output rotation pulses, and returns a shift control to normal when the set time elapses.

17. A starting shift control method for a continuously variable transmission for a vehicle, comprising:

detecting an input rotation of the transmission drivingly connected to a prime mover of the vehicle and producing input rotation pulses at repetition periods corresponding to the input rotation;

detecting an output rotation of the transmission and producing output rotation pulses at repetition periods corresponding to the output rotation;

calculating an actual gear ratio of the transmission on the basis of the input rotation pulses and the output rotation pulses; and controlling so that the actual gear ratio becomes equal to a target gear ratio;

wherein the controlling includes judging whether or not a start of the vehicle is a high start in which the actual gear ratio at start of the vehicle is a high speed side gear ratio by comparison between the generated number of the input rotation pulses and the generated number of the output rotation pulses from the time a first vehicle starting operation is made after start of the prime mover, and restricting downshifting from the high speed side gear ratio to the target gear ratio when the start of the vehicle is judged to be the high start.

18. A starting shift control method according to claim 17, wherein it is judged that the start of the vehicle is the high start when the generated number of the output rotation pulses at the moment when a predetermined number of the input rotation pulses are generated, is equal to or larger than a set value.

19. A starting shift control method according to claim 18, wherein the predetermined number of the output rotation pulses is matched with the amount of input rotation of the transmission before the actual gear ratio becomes equal to the target gear ratio.

20. A starting shift control method according to claim 17, wherein it is judged that the high start is caused when the generated number of input rotation pulses at the moment when a predetermined number of the output rotation pulses are generated, is less than a set value.

21. A starting shift control method according to claim 20, wherein the predetermined number of the output rotation pulses is matched with an output rotation before the actual gear ratio becomes equal to the target gear ratio.

22. A starting shift control method according to claim 17, wherein it is judged whether or not the start of the vehicle is the high start on the basis of the ratio between the generated number of the input rotation pulses and the generated number of the output rotation pulses during a set time elapsing from the time a first vehicle starting operation is made after start of the prime mover.

23. A starting shift control method according to claim 22, wherein the set time is an expected time before the actual gear ratio becomes equal to the target gear ratio.

24. A starting shift control method according to claim 17, wherein it is judged whether or not the start of the vehicle is the high start on the basis of the difference between the generated number of the input rotation pulses and the generated number of the output rotation pulses during a set time elapsing from the time a first vehicle starting operation is made after start of the prime mover.

25. A starting shift control method according to claim 24, wherein the set time is an expected time before the actual gear ratio becomes the target gear ratio.

26. A starting shift control method according to claim 17, wherein a judgment on the high start is stopped when a vehicle speed is in a relatively high speed range enabling the output rotation to be obtained from the repetition periods of the output rotation pulses.

27. A starting shift control method according to claim 17, wherein a judgment on the high start is stopped when the input rotation is in a relatively high rotation range enabling the input rotation to be obtained from the repetition periods of the input rotation pulses.

28. A starting shift control method according to claim 17, wherein the transmission is permitted to be an intermediate gear ratio between the high speed side gear ratio at the time of judgment of the high start and the lowermost speed gear ratio and a shift control is returned to normal when the actual gear ratio coincides with the intermediate gear ratio.

29. A starting shift control method according to claim 17, wherein the transmission is permitted to be an intermediate gear ratio between the high speed side gear ratio at the time of judgment of the high start and a lowermost speed gear ratio and a shift control is returned to normal when a difference between the actual gear ratio and the intermediate gear ratio is equal to or smaller than a predetermined value.

30. A starting shift control method according to claim 17, wherein the transmission is permitted to be an intermediate gear ratio between the high speed side gear ratio and a lowermost speed gear ratio at the time of judgment of the high start, the target gear ratio is changed gradually from the intermediate gear ratio toward an optimal gear ratio suited to a driving condition of the vehicle after the transmission is in such a rotation range enabling calculation of the actual gear ratio by obtaining the input rotation and the output rotation from the respective repetition periods of the input rotation pulses and the output rotation pulses, and a shift control is returned to normal when the actual gear ratio coincides with the optimal gear ratio.

31. A starting shift control method according to claim 17, wherein the transmission is permitted to be an intermediate gear ratio between the high speed side gear ratio and a lowermost speed gear ratio at the time of judgement of the high start, the target gear ratio is changed gradually from the intermediate gear ratio toward an optimal gear ratio suited to a driving condition of the vehicle after the transmission is in such a rotation range enabling calculation of the actual gear ratio by obtaining the input rotation and the output rotation from the respective repetition periods of the input rotation pulses and the output rotation pulses, and a shift control is returned to normal when the difference between the actual gear ratio and the optimal gear ratio is equal to or smaller than a set value.

32. A starting shift control system according to claim 17, wherein the transmission is permitted to be an intermediate gear ratio between the high speed side gear ratio and a lowermost speed gear ratio at the time of judgement of the high start, the target gear ratio is changed gradually from the intermediate gear ratio toward an optimal gear ratio suited to a driving condition of the vehicle during a set time after the transmission is in such a rotation range enabling calculation of the actual gear ratio by obtaining the input rotation and the output rotation from the respective repetition periods of the input rotation pulses and the output rotation pulses, and a shift control is returned to normal when the set time elapses.

* * * * *